(12) United States Patent
Zhang et al.

(10) Patent No.: US 12,445,007 B2
(45) Date of Patent: Oct. 14, 2025

(54) BUSBAR HOLDER FOR MOTOR AND MOTOR

(71) Applicant: NIDEC CORPORATION, Kyoto (JP)

(72) Inventors: Yi Zhang, Liaoning (CN); Wenbin Ge, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 196 days.

(21) Appl. No.: 18/528,788

(22) Filed: Dec. 5, 2023

(65) Prior Publication Data

US 2024/0195257 A1 Jun. 13, 2024

(30) Foreign Application Priority Data

Dec. 9, 2022 (CN) .......................... 202211579929.5

(51) Int. Cl.
*H02K 3/52* (2006.01)

(52) U.S. Cl.
CPC .......... *H02K 3/522* (2013.01); *H02K 2203/09* (2013.01)

(58) Field of Classification Search
CPC ........ H02K 2203/09; H02K 3/50; H02K 3/52; H02K 3/522

USPC ........................................................... 310/71
See application file for complete search history.

(56) References Cited

U.S. PATENT DOCUMENTS

| | | | | |
|---|---|---|---|---|
| 4,468,547 A | * | 8/1984 | Belttary | ................ H01H 71/08 439/907 |
| 2021/0305870 A1 | * | 9/2021 | Takahashi | ................ H02K 5/08 |

\* cited by examiner

*Primary Examiner* — Naishadh N Desai
(74) *Attorney, Agent, or Firm* — JCIPRNET

(57) ABSTRACT

Disclosed is a busbar holder for a motor and a motor. The busbar holder includes a main body in an annular or substantially annular shape and a plurality of feet extending downwards along the main body. The main body has an axial force receiver that receives force in an axial direction. At least one foot among the plurality of feet is positioned axially below the axial force receiver, a height of the at least one foot in the axial direction is less than heights of other feet among the plurality of feet in the axial direction, and the other feet are supported by a stator core of the motor. The busbar holder is thus reliably supported, and the busbar holder is prevented from being damaged when the axial force receiver is subjected to axial pressure.

10 Claims, 7 Drawing Sheets

BUSBAR HOLDER FOR MOTOR AND MOTOR

CROSS REFERENCE TO RELATED APPLICATIONS

The present invention claims priority under 35 U.S.C. § 119 to Chinese Application No. CN202211579929.5 filed on Dec. 9, 2022, the entire content of which is incorporated herein by reference.

FIELD OF THE DISCLOSURE

The disclosure relates to the field of electromechanical technology, and in particular, relates to a busbar holder for a motor and a motor.

BACKGROUND

With the development of science and technology, motors have been used in various electrical products. In a conventional motor structure, the motor has a busbar holder for holding the busbar, and the busbar holder has four feet of equal length. Two of the feet are below the power terminals and are used to reliably support the power terminals when the power terminals are axially pressed downwards, so that the busbar holder is prevented from being crushed. The other two feet are inserted into the insulating groove of the stator core and are used for supporting and circumferentially positioning the busbar holder.

It should be noted that the above introduction to the technical background is only set forth to facilitate a clear and complete description of the technical solutions of the disclosure and to facilitate understanding of a person having ordinary skill in the art. It should not be considered that the above technical solutions are well-known to a person having ordinary skill in the art just because these solutions are described in the BACKGROUND section of the disclosure.

The inventor found that in the existing structure, the lengths of the feet of the busbar holder during the actual production process or product assembly process are different. When the feet supporting the power terminals are longer than the other feet, the busbar holder will be skewed and displaced, which in turn will cause the busbar holder to be unstable and easy to float and will then cause the busbar holder to be damaged.

SUMMARY

According to an aspect of the example of the embodiments of the disclosure, a busbar holder for a motor includes a main body and a plurality of feet.

The main body is in an annular or substantially annular shape.

The plurality of feet extend downwards along the main body.

The main body has an axial force receiver that receives force in an axial direction.

At least one foot among the plurality of feet is positioned axially below the force receiver, a height of the at least one foot in the axial direction is less than heights of other feet among the plurality of feet in the axial direction, and the other feet are supported by a stator core of the motor.

In this way, the busbar holder is reliably supported, and the feet for supporting the force receiver is prevented from being excessively long, resulting in an inaccurate positioning surface of the busbar holder. Further, when the axial force receiver is subjected to axial pressure, the busbar holder is prevented from being damaged.

In some examples of the embodiments, the plurality of feet include at least 4 feet, where the other feet include at least 3 feet.

This can ensure that at least 3 of the feet are used to define a stable supporting surface of the busbar holder, and the other one of the feet is used to support the axial force receiver.

In some examples of the embodiments, at least a portion of an axially upper side of the stator core is covered by an insulator.

The at least 3 feet are inserted into the insulator.

In this way, misalignment of the busbar holder in a circumferential direction is able to be reliably prevented from occurring.

In some examples of the embodiments, the axial force receiver is a power terminal supporting portion that receives force in the axial direction.

In this way, when power terminals are inserted into a power supply, the busbar holder is able to be reliably prevented from being crushed.

In some examples of the embodiments, the power terminal supporting portion supports a plurality of power terminals extending in the axial direction, and circumferential spacing distances between two power terminals adjacent to each other among the plurality of power terminals in the circumferential direction are different.

The at least one foot is located between the two power terminals whose circumferential spacing distance is the greatest.

In this way, a sufficient space is left for a welding operation at roots of the power terminals.

In some examples of the embodiments, the power terminal supporting portion supports a plurality of power terminals extending in the axial direction.

The other feet are equally disposed along the main body in the circumferential direction, and none of the other feet is located axially below the power terminals.

The space for the welding operation of the power supply terminals is thus satisfied.

In some examples of the embodiments, a radially outer surface of the power terminal supporting portion is close to a radially inner side than a radially outer surface of the stator core.

The radially outer surface of the power terminal supporting portion is close to a radially outer side than a radially outer surface of the at least one foot, or the radially outer surface of the power terminal supporting portion is radially flush with the radially outer surface of the at least one foot.

In this way, molding is able to be easily performed, and the outer surface of the foot is prevented from exceeding the outer surface of the stator core.

In some examples of the embodiments, a radially inner surface of the at least one foot is close to a radially outer side than radially inner surfaces of the other feet.

The space for the welding operation of the power supply terminals is satisfied, and the interference with welding points is prevented from occurring.

According to another aspect of the example of the embodiments of the disclosure, a motor is disclosed, and the electrical product includes the busbar holder and the stator core described in any one of the above examples of the embodiments. A gap is defined between the at least one foot of the busbar holder and the stator core in the axial direction.

In some examples of the embodiments, a difference value of the gap between the at least one foot and the stator core in the axial direction is between 0.1 mm and 0.5 mm.

In this way, the power terminals are reliably supported when subjected to an axial force, and damage caused by an excessively-large gap is prevented from occurring.

The above and other elements, features, steps, characteristics and advantages of the present disclosure will become more apparent from the following detailed description of the preferred embodiments with reference to the attached drawings.

The features described and/or shown for one example of the embodiments can be used in the same or similar manner in one or more other example of the embodiments, combined with features in other example of the embodiments, or substituted for features in other examples of the embodiments.

BRIEF DESCRIPTION OF THE DRAWINGS

The above and other objects, features, and advantages of the example of the embodiments of the disclosure will become more apparent from the following detailed description in together with the accompanying drawings, and the following accompanying drawings are provided.

DESCRIPTION OF THE EMBODIMENTS

With reference to the accompanying drawings, the foregoing and other features of the disclosure becomes apparent through the following description. In the specification and drawings, specific implementations of the disclosure are specifically disclosed, which indicate some implementations in which the principles of the disclosure may be adopted. It will be understood that the disclosure is not limited to the described implementations but includes all modifications, variations, and equivalents falling within the scope of the appended claims.

In the example of the embodiments of the disclosure, the term "and/or" includes any and all combinations of one or more of the associated listed items. The terms such as "including" and "having" are intended to specify the presence of stated features, elements, devices, or components, but do not exclude the presence or addition of one or more other features, elements, devices, or components.

In the example of the embodiments of the disclosure, the singular forms "a", "the", etc. are intended to include the plural forms and should be broadly understood as "a type" or "a class" rather than being limited to the meaning of "one". In addition, the term "said" should be understood to include both singular and plural forms, unless the context clearly indicates otherwise. Besides, the term "according to" should be understood as "according at least in part to", and the term "based on" should be understood as "based at least in part on", unless the context clearly indicates otherwise.

In addition, in the following description of the disclosure, for the convenience of description, a direction extending along a central axis CC' of a motor or a direction parallel thereto is referred to as an "axial direction". A radius direction centered on the central axis is referred to as a "radial direction". A direction surrounding the central axis is referred to as a "circumferential direction". A side away from the central axis in the radius direction is referred to as a "radially outer side". A side away close to the central axis in the radius direction is referred to as a "radially inner side". Further, a direction from a bottom of a motor case to an opening of the motor case is referred to as "above" or "upper side", and a direction from the opening of the motor case to the bottom of the motor case is referred to as "below" or "lower side". It should be noted that the definition of each direction in this specification is only for the convenience of describing the example of the embodiments of the disclosure and does not limit the direction of the motor during use and manufacturing.

The implementation of the example of the embodiments of the disclosure will be described below with reference to the drawings.

Figure 1:
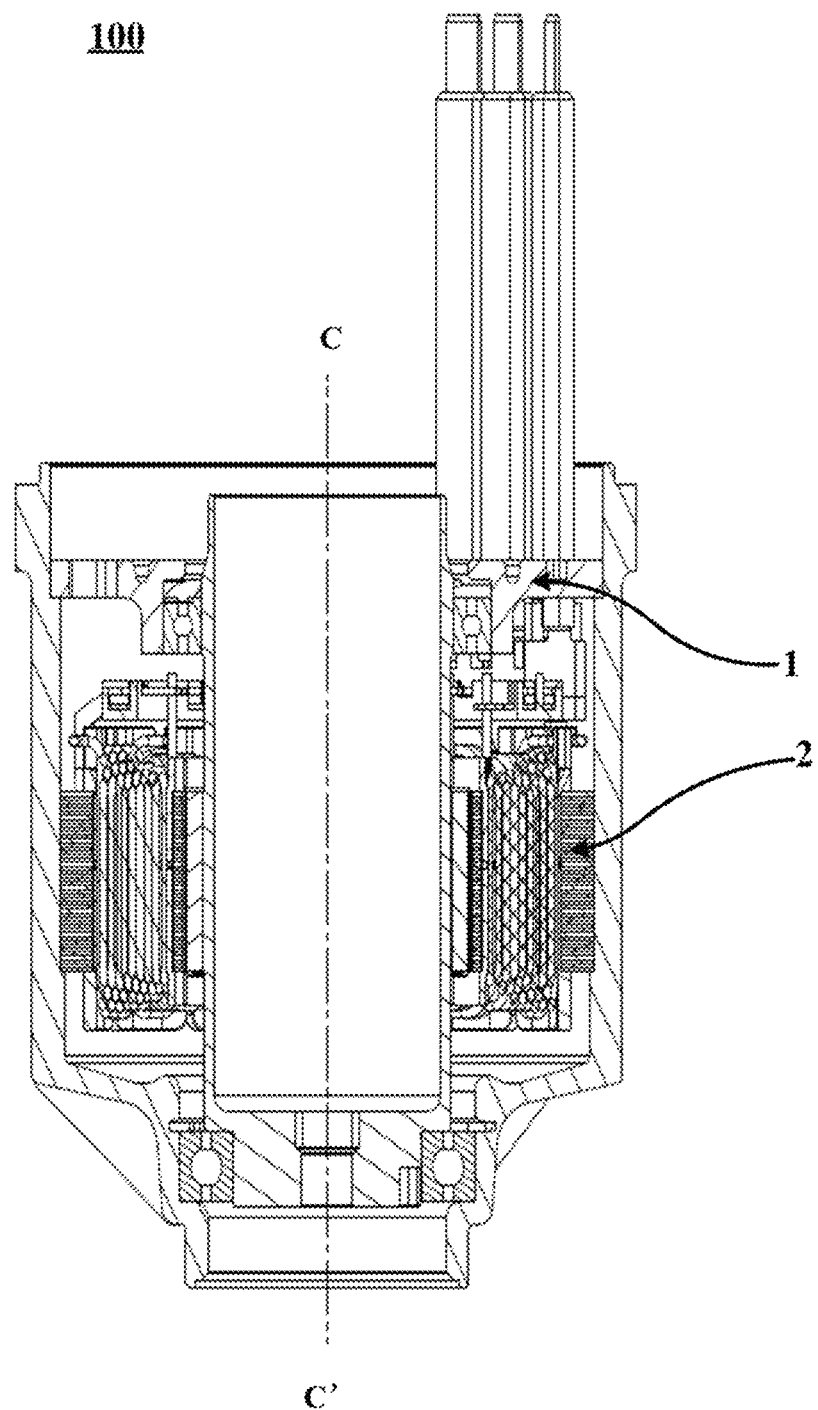
FIG. 1 is a cross-sectional view of a motor having a busbar holder according to an example of the embodiments of the disclosure.
Figure 2:
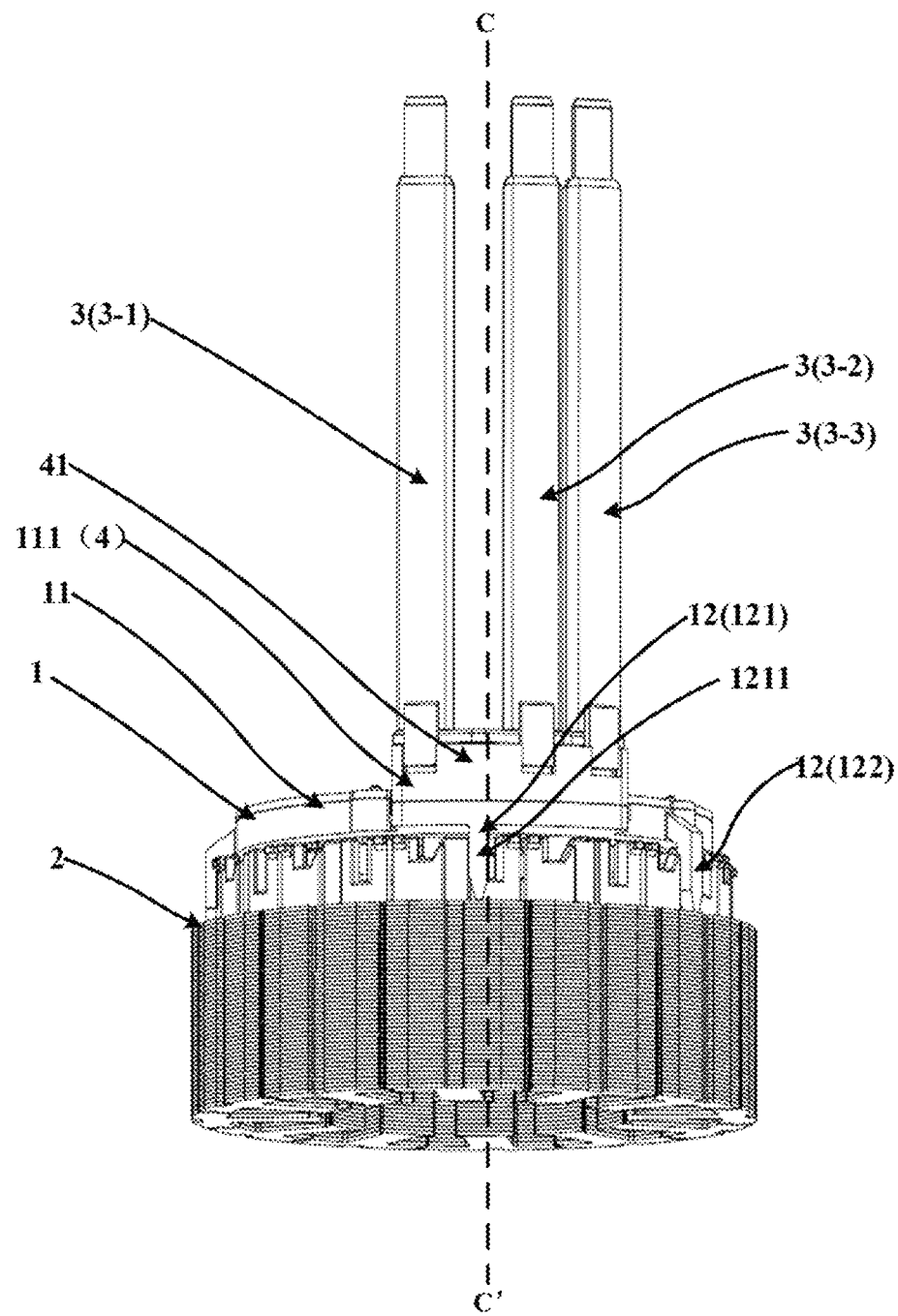
FIG. 2 is a schematic view of the busbar holder and a stator core according to an example of the embodiments of the disclosure.
Figure 3:
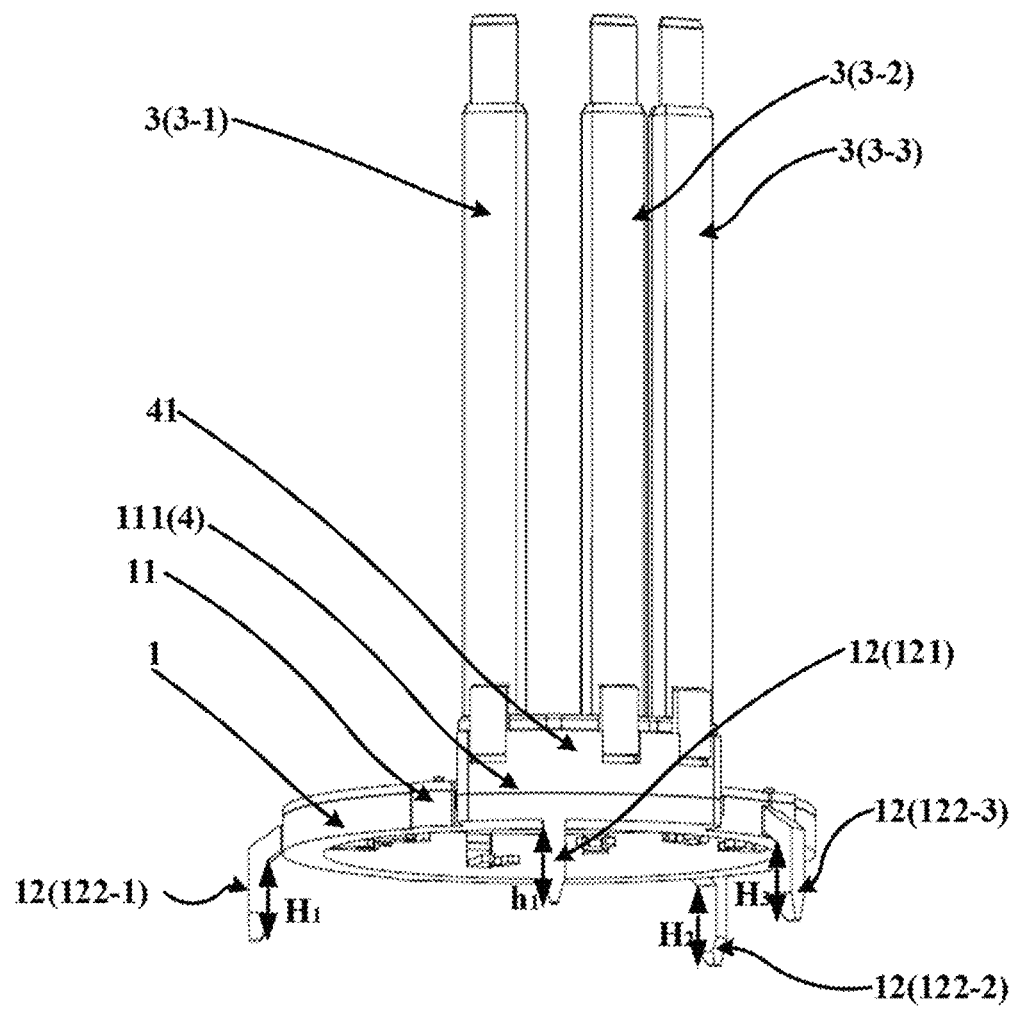
FIG. 3 is a schematic view of the busbar holder for the motor according to an example of the embodiments of the disclosure.

FIG. 1 is a cross-sectional view of a motor having a busbar holder according to an example of the embodiments of the disclosure. FIG. 2 is a schematic view of the busbar holder and a stator core according to an example of the embodiments of the disclosure. FIG. 3 is a schematic view of the busbar holder for the motor according to an example of the embodiments of the disclosure.

As shown in FIG. 1, a busbar holder 1 is used in a motor 100, and the motor 100 includes a stator core 2. As shown in FIG. 2 and FIG. 3, the busbar holder 1 for the motor 100 includes a main body 11 and feet 12.

As shown in FIG. 3, the main body 11 is in an annular or substantially annular shape, a plurality of feet 12 are disclosed, and the feet 12 extend downwards along the main body 11. The main body 11 has an axial force receiver 111 that receives force in an axial direction along a central axis (e.g., CC' shown in FIG. 1) of the motor 100. At least one foot 121 among the plurality of feet 12 is positioned axially below (i.e., on the C' side) the axial force receiver 111, a height of the at least one foot 121 in the axial direction is less than heights of other feet 122 among the plurality of feet 12 in the axial direction, and the other feet 122 are supported by the stator core 2 of the motor.

For instance, as shown in FIG. 3, the least one foot 121 among the plurality of feet 12 extends axially downwards of the central axis along a lower surface of the main body 11, and the feet 12 may also extend downwards from an outer peripheral surface of the main body 11, which is not limited thereto. When the feet 12 extend axially downwards of the central axis along the lower surface of the main body 11, radial positions of the feet 12 may be defined by a radial position of the outer peripheral surface of the main body. The height of the foot 121 is $h_1$, and the other feet 122 extend axially downwards along the central axis along the main body 11. The heights of the plurality of feet 122 are $H_1$, $H_2$, and $H_3$, and the height $h_1$ is less than $H_1$, $H_2$, and $H_3$.

As such, by arranging the at least one foot 121 among the plurality of feet 12 of the busbar holder 1 to be axially below the axial force receiver 111 and allowing the height of the at least one foot 121 in the axial direction to be less than the heights of other feet 122 among the plurality of feet 12 in the axial direction, the busbar holder 1 may be reliably supported, and the busbar holder 1 may be prevented from being damaged when the axial force receiver 111 is subjected to axial pressure.

In some examples of the embodiments, as shown in FIG. 3, the plurality of feet 12 includes at least 4 feet, where the other feet 122 include at least 3 feet 122-1, 122-2, and 122-3.

For instance, as shown in FIG. 3, the plurality of feet 12 include one foot 121 located axially below the axial force receiver 111 and three other feet 122-1, 122-2, and 122-3. However, the disclosure is not limited thereto, and the number of feet 12 may be more than 4.

This can ensure that at least 3 of the feet (122-1, 122-2, and 122-3) are used to define a supporting surface of the busbar holder, and the other foot is used to support the axial force receiver 111 and is used to support the foot of the axial force receiver 111 without affecting the position of the supporting surface of the busbar holder.

Figure 4:
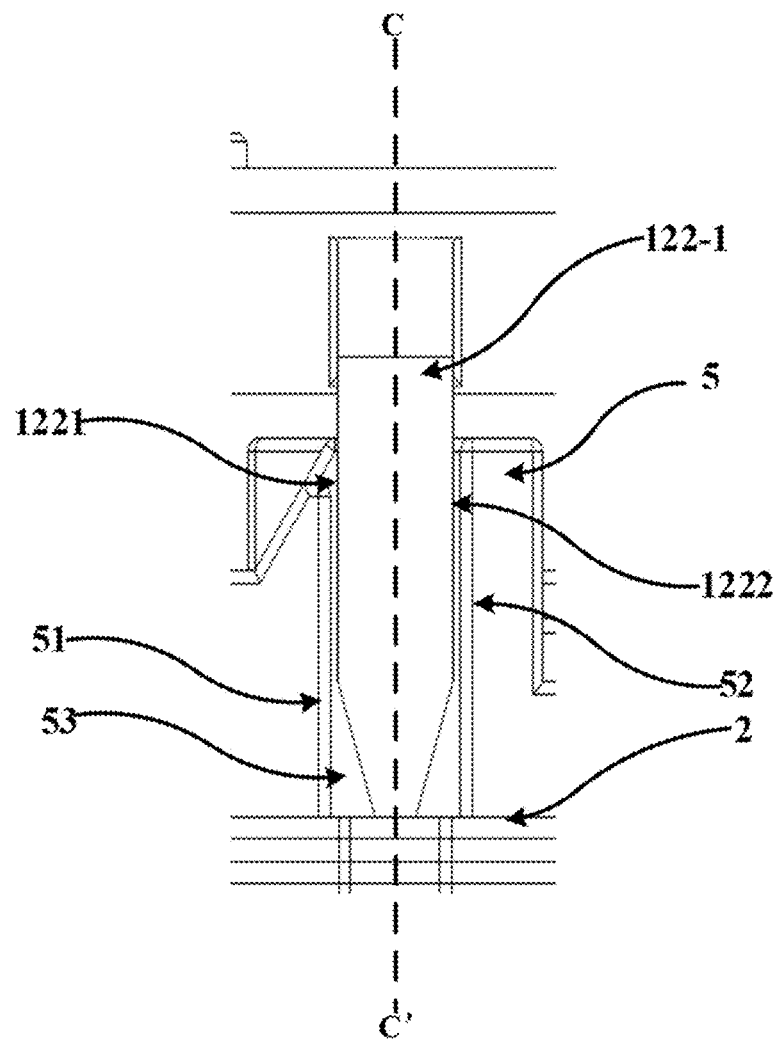
FIG. 4 is a schematic view of a feet according to an example of the embodiments of the disclosure.
Figure 5:
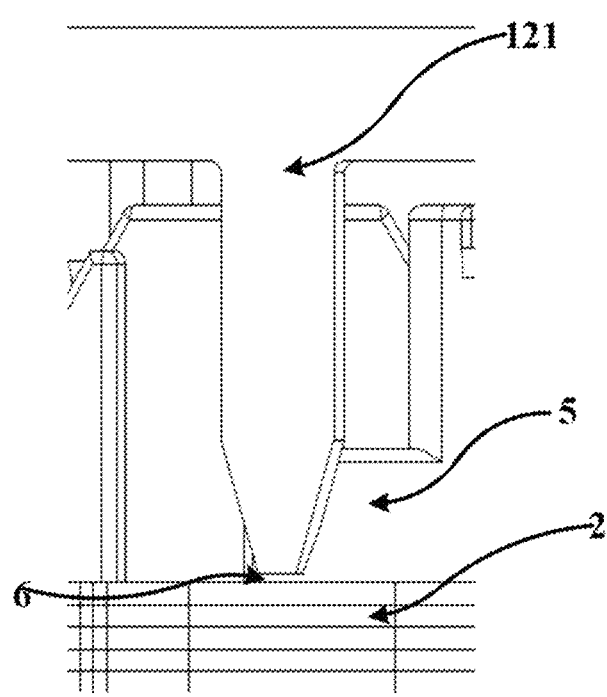
FIG. 5 is another schematic view of the feet according to an example of the embodiments of the disclosure.

FIG. 4 is a schematic view of a feet according to an example of the embodiments of the disclosure. FIG. 5 is another schematic view of the feet according to an example of the embodiments of the disclosure.

In some examples of the embodiments, as shown in FIG. 4 and FIG. 5, at least a portion of an axially upper side of the stator core 2 is covered by an insulator 5, and at least 3 feet 122 are inserted into the insulator 5. In addition, the foot 121 may not be inserted into the insulator 5.

For instance, as shown in FIG. 4, taking one foot 122-1 as an example, the insulator 5 covers a portion of a side of an axially upper side C of the stator core 2. The insulator 5 has a first wall 51 and a second wall 52, and a groove 53 of the insulator 5 is defined on the axially upper side (C side) of the stator core 2 by the first wall 51 and the second wall 52. The foot 122-1 has a first side wall 1221 and a second side wall 1222. During installation, the foot 122-1 is inserted into the groove 53 of the insulator 5, the first side wall 1221 abuts against the first wall 51, and the second side wall 1222 abuts against the second wall 52, so that the foot 122-1 is engaged with the insulator 5. Herein, 122-1 is taken as an example, and at least three grooves 53 into which the feet 122 may be inserted are defined in the circumferential direction on the axially upper side of the stator core 2. However, the disclosure is not limited thereto, and the number of grooves 53 may be more than 3.

As such, misalignment caused by the circumferential rotation of the busbar holder 1 may be reliably prevented from occurring.

In some examples of the embodiments, as shown in FIG. 3, the axial force receiver 111 is a power terminal supporting portion 4 that receives force in the axial direction.

In this way, when power terminals 3 are inserted into a power supply, the busbar holder 1 may be reliably prevented from being crushed.

However, the axial force receiver in the example of the embodiments of the disclosure may also be other portions or components that are force-receiving in the axial direction. For instance, the axial force receiver may also be a circuit board insert supporting a circuit board or a connector matched with an external component.

In some examples of the embodiments, the power terminal supporting portion supports 4 a plurality of power terminals 3 extending in the axial direction, and circumferential spacing distances between two power terminals 3 adjacent to each other among the plurality of power terminals 3 in the circumferential direction are different. The at least one foot 121 is located between the two power terminals 3 whose circumferential spacing distance is the greatest.

For instance, as shown in FIG. 3, the circumferential spacing distances between power terminals 3-1 and 3-2 and between 3-2 and 3-3 among a plurality of power terminals 3-1, 3-2, and 3-3 are different. Herein, the circumferential spacing distance between the power terminals 3-1 and 3-2 is greater than the circumferential spacing distance between the power terminals 3-1 and 3-2, so that the at least one foot 121 among the feet 12 is disposed between the power terminals 3-1 and 3-2 in the circumferential direction.

In this way, a sufficient space is left for a welding operation at roots of the power terminals 3.

Figure 6:
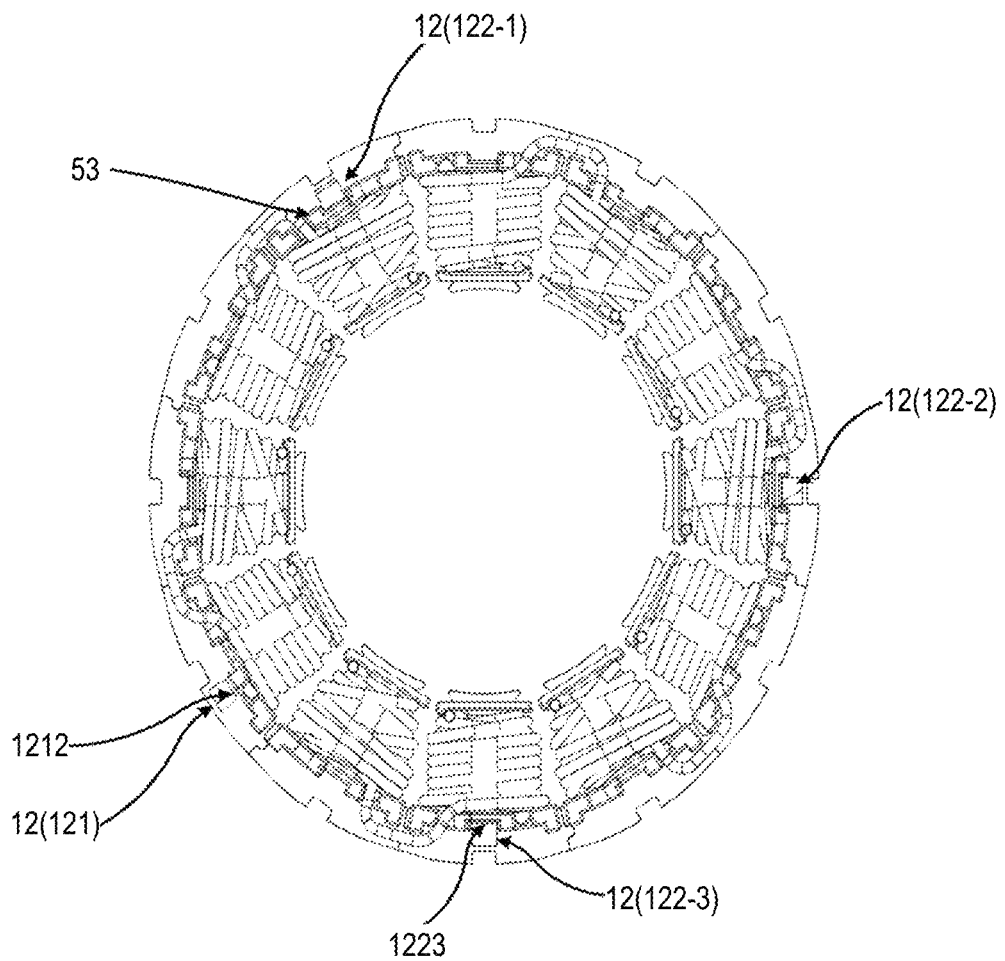
FIG. 6 is a top view of the busbar holder according to an example of the embodiments of the disclosure.

FIG. 6 is a top view of the busbar holder according to an example of the embodiments of the disclosure.

In some examples of the embodiments, as shown in FIG. 3 and FIG. 6, the power terminal supporting portion 4 supports the plurality of power terminals 3 extending in the axial direction. The other feet 122-1, 122-2, and 122-3 are equally disposed along the main body 11 in the circumferential direction, and none of the other feet 122-1, 122-2, and 122-3 is located axially below the power terminals 3.

For instance, the busbar holder 1 is divided into three equal portions in the circumferential direction, and the distance between the feet 122-1 and 122-2 among the other feet 122 is equal to the distance between the feet 122-2 and 122-3 in the circumferential direction. It can also be seen that the three other feet 122 are all inserted into the groove 53 (shown in FIG. 6). However, among the four feet 12, only the foot 121 is located axially below the power terminal 3, and none of the other feet 122 is located axially below the power terminal 3.

The space for the welding operation of the power supply terminals 3 is thus satisfied.

In some examples of the embodiments, as shown in FIG. 2 and FIG. 3, a radially outer surface 41 of the power terminal supporting portion 4 is close to a radially inner side than a radially outer surface 221 of the stator core 2, the radially outer surface 41 of the power terminal supporting portion 4 is close to a radially outer side than a radially outer surface 1211 of the at least one foot 121, or the radially outer surface 41 of the power terminal supporting portion 4 is radially flush with the radially outer surface 1211 of the at least one foot 121.

That is, the radially outer surface 1211 of the foot 121 axially below the power terminal 3 does not exceed the radially outer surface 21 of the stator core 2 and the radially outer surface 41 of the power terminal supporting portion 4 and is close to the radially inner side than the radially outer surface 21 of the stator core 2.

In this way, molding may be easily performed, and the outer surface of the foot 121 on the lower side of the power terminal supporting portion 4 is prevented from exceeding the outer surface 21 of the stator core 2.

In some examples of the embodiments, a radially inner surface 1212 of the at least one foot 121 is close to the radially outer side than radially inner surfaces 1223 of the other feet 122.

For instance, as shown in FIG. 6, it can be seen from the top view of the busbar holder 1, taking the foot 121 and the foot 122-3 as an example, the radially inner surface 1212 of the foot 121 is close to the radially outer side than the radially inner surface 1223 of the foot 122-3, and it can be seen that the radially inner surface 1212 of the foot 121 is closer to the radially outer side.

The space for the welding operation of the power supply terminals 3 is satisfied, and the interference with welding points is prevented from occurring.

According to the above example of the embodiments, by arranging the at least one foot 121 among the plurality of feet 12 of the busbar holder 1 to be axially below the axial force receiver 111 and allowing the height of the at least one foot 121 in the axial direction to be less than the heights of other feet 122 among the plurality of feet 12 in the axial direction, the busbar holder 1 may be reliably supported, and the busbar holder 1 may be prevented from being damaged when the axial force receiver 111 is subjected to axial pressure.

In the example of the embodiments of the disclosure, a motor includes the busbar holder 1 as described in the example of the embodiments of the above aspect. Since the structure of the busbar holder 1 is described in the above aspect, description of the same content as the example of the embodiments of the above aspect is not going to be repeated herein.

Figure 7:
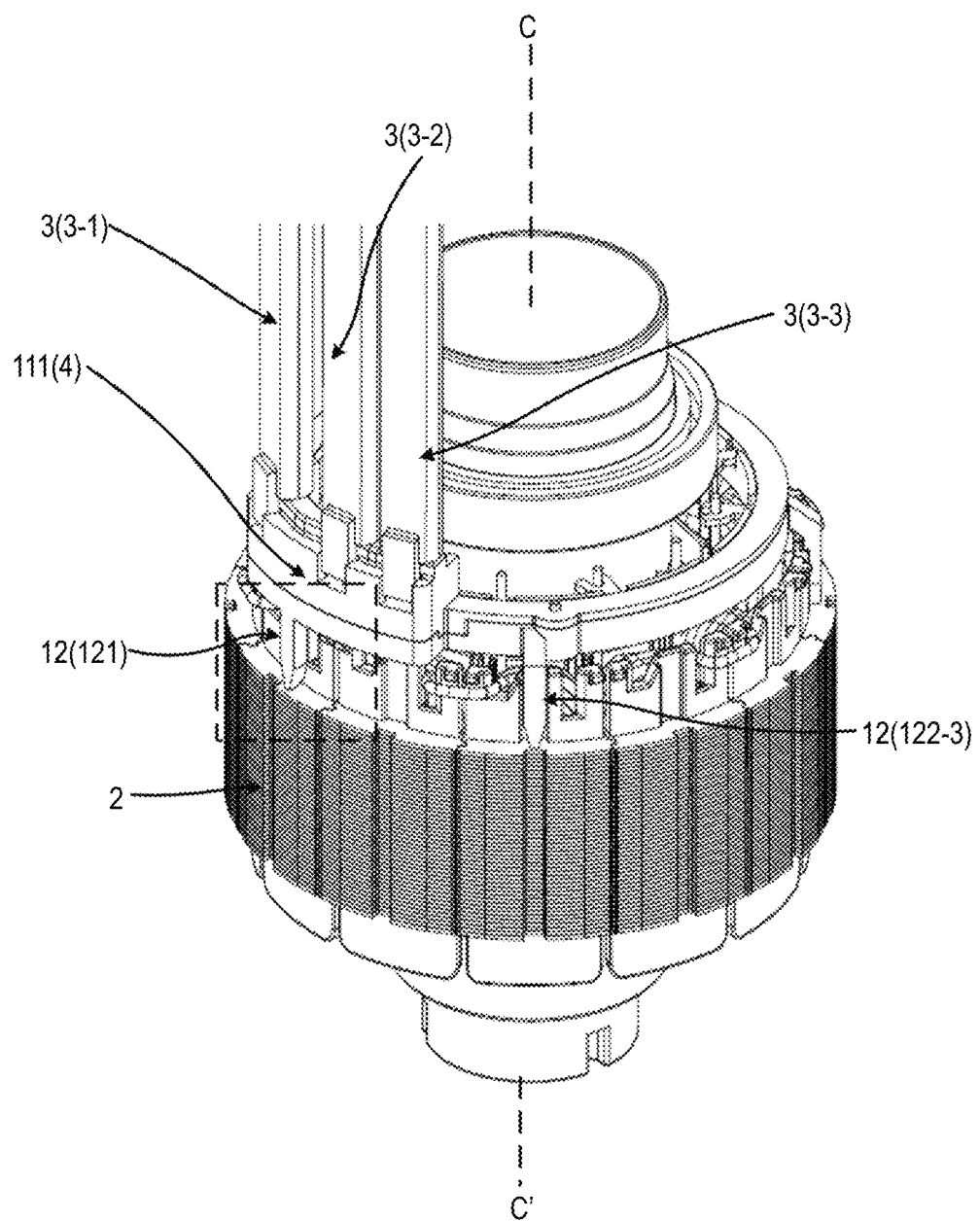
FIG. 7 is a side view of the busbar holder according to an example of the embodiments of the disclosure.

FIG. 7 is a schematic view of the motor according to an example of the embodiments of the disclosure. As shown in FIG. 7, the motor 100 includes the busbar holder 1 and the stator core 2.

As shown in FIG. 7, a gap is defined between the at least one foot 121 of the busbar holder 1 and the stator core 2 in the (CC') axial direction.

In some examples of the embodiments, a difference value of the gap between the at least one foot 121 and the stator core 2 in the axial direction is between 0.1 mm and 0.5 mm.

For instance, FIG. 5 is also a partially enlarged view of the dashed box in FIG. 7, and as shown in FIG. 5, a gap 6 is defined between the foot 121 and the stator core 2 in the axial direction, and the difference value of the gap 6 is between 0.1 mm and 0.5 mm. As shown in FIG. 4, the gap 6 is not defined between the other feet 122 and the stator core 2 in the axial direction, and the feet 122 abut against the stator core 2.

In this way, the power terminals 3 are reliably supported when subjected to an axial force, and damage caused by an excessively-large gap is prevented from occurring.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A busbar holder for a motor, wherein the busbar holder comprises:
a main body in an annular or substantially annular shape; and
a plurality of feet extending downwards along the main body,
wherein the main body has an axial force receiver that receives force in an axial direction,
wherein at least one foot among the plurality of feet is positioned axially below the axial force receiver, a height of the at least one foot in the axial direction is less than heights of other feet among the plurality of feet in the axial direction, and the other feet are supported by a stator core of the motor.

2. The busbar holder according to claim 1, wherein the plurality of feet comprise at least 4 feet, wherein the other feet comprise at least 3 feet.

3. The busbar holder according to claim 2, wherein at least a portion of an axially upper side of the stator core is covered by an insulator, and
the at least 3 feet are inserted into the insulator.

4. The busbar holder according to claim 1, wherein the axial force receiver is a power terminal supporting portion that receives force in the axial direction.

5. The busbar holder according to claim 4, wherein the power terminal supporting portion supports a plurality of power terminals extending in the axial direction, and circumferential spacing distances between two power terminals adjacent to each other among the plurality of power terminals in a circumferential direction are different,
the at least one foot is located between the two power terminals whose circumferential spacing distance is the greatest.

6. The busbar holder according to claim 4, wherein the power terminal supporting portion supports a plurality of power terminals extending in the axial direction,
the other feet are equally disposed along the main body in a circumferential direction, and none of the other feet is located axially below the power terminals.

7. The busbar holder according to claim 4, wherein a radially outer surface of the power terminal supporting portion is close to a radially inner side than a radially outer surface of the stator core,
the radially outer surface of the power terminal supporting portion is close to a radially outer side than a radially outer surface of the at least one foot, or the radially outer surface of the power terminal supporting portion is radially flush with the radially outer surface of the at least one foot.

8. The busbar holder according to claim 1, wherein a radially inner surface of the at least one foot is close to a radially outer side than radially inner surfaces of the other feet.

9. A motor, comprising the busbar holder and the stator core according to claim 1, wherein a gap is defined between the at least one foot of the busbar holder and the stator core in the axial direction.

10. The motor according to claim 9, wherein a difference value of the gap between the at least one foot and the stator core in the axial direction is between 0.1 mm and 0.5 mm.

* * * * *